April 24, 1962 — G. WENNERBERG — 3,031,667
MAGNETIC ANTENNA APPARATUS
Filed Nov. 3, 1959 — 3 Sheets-Sheet 1

INVENTOR.
GUNNAR WENNERBERG
BY
Richard P. Albert
AGENT

April 24, 1962  G. WENNERBERG  3,031,667
MAGNETIC ANTENNA APPARATUS
Filed Nov. 3, 1959  3 Sheets-Sheet 2

INVENTOR.
GUNNAR WENNERBERG
BY
Richard P. Albert
AGENT

April 24, 1962 G. WENNERBERG 3,031,667
MAGNETIC ANTENNA APPARATUS

Filed Nov. 3, 1959 3 Sheets-Sheet 3

INVENTOR.
GUNNAR WENNERBERG
BY
Richard P. Alben
AGENT

United States Patent Office 3,031,667
Patented Apr. 24, 1962

3,031,667
MAGNETIC ANTENNA APPARATUS
Gunnar Wennerberg, Pacific Palisades, Calif., assignor, by mesne assignments, to Motorola, Inc., Chicago, Ill., a corporation of Illinois
Filed Nov. 3, 1959, Ser. No. 850,616
4 Claims. (Cl. 343—788)

This invention relates to loop antennas and more particularly to means for changing the quadrantal error of loop antennas.

This invention is an improvement over the earlier U.S. patent application No. 706,912, "Magnetic Antenna Systems" by Gunnar Wennerberg, filed January 3, 1958, and assigned to the assignee of this application. As disclosed in the above-mentioned application, automatic direction finding systems normally have two loops which are wound 90° apart around a ferrite core or slab, that is, the loops are perpendicular to each other in the same plane. Normally, the antenna is mounted on the aircraft with one loop parallel to the aircraft fuselage. The object of the loops is to collect the electromagnetic energy which is generated by radio waves passing through the core and then transmit the electromagnetic energy as an electrical signal to the receiver. The difficulty is that the aircraft fuselage near the antenna acts as a baffle to aid the loop parallel to the fuselage in picking up a stronger signal. In other words, the fuselage directs more radio wave signals to the parallel loop than to the other loop. Hence, a radio wave signal of a given magnitude coming from one direction is picked up by one loop and an electrical signal of a particular magnitude is transmitted to the receiver. However, if the same radio wave signal is transmitted from a direction 90° from the first radio wave signal, it is picked up by the second loop and the second loop will transmit to the receiver an electrical signal that will be different in magnitude from the electrical signal transmitted by the first loop. If the signal comes from a direction of 45° from either loop then one loop will pick up a stronger radio wave signal than the other loop. Hence, using coordinate converters or a vector diagram method, the resultant of the two signals will not indicate that the original signal came from a direction 45° from each loop. In other words, there is a quadrantal error. Some means of compensation is necessary to correct for the unbalance of the pickup of the loops.

In the past, electrical loops have been utilized of the same size but around the first loop which is parallel to the aircraft body, the loop having the advantage of the aircraft as a baffle thereby picking up a stronger signal, there is usually a corrector strip. This corrector strip is actually a shorted turn and detracts from or reduces the sensitivity of the first loop thereby making its sensitivity substantially equal to the sensitivity of the other loop. The disadvantage of the corrector strip is that the loop parallel to the aircraft body has to be made so as to insure more sensitivity than the second loop or the loop perpendicular thereto. Also, when manufacturing the antenna, it is difficult to provide the proper corrective strip or shorted turn to give a zero quadrantal error since the position of the loop antenna on the aircraft body determine how much baffling effect will be contributed by the aircraft body.

Another system used in the past is that described in the above-mentioned prior application. As shown in the prior application, the ferrite slab around which the coils are wound is made of a shape other than round or square. The slab may be rectangular so that the long side is parallel to the aircraft body. It is known that in using a rectangular ferrite slab with perpendicular windings having the same inductance around the slab, an incoming radio wave signal of equal magnitude passing through the end and side of the slab will cause one winding to pick up an electrical signal of greater magnitude than the electrical signal picked up by the other winding. Hence, with a rectangular slab the baffle effect from the aircraft body is compensated for by mounting the long side of the ferrite slab parallel to the aircraft body. However, this antenna must be designed knowing the location on the aircraft where the antenna is to be mounted, so that the baffle effect of the aircraft can be taken into consideration when designing the configuration of the antenna.

It is therefore an object of this invention to provide an adjustable baffle means and to increase the sensitivity of an automatic direction finding loop antenna.

Another object of this invention is to provide a simplified means for adjusting the sensitivity of an automatic direction finder antenna whereby the adjustment can be made after the antenna is installed in the aircraft.

A further object of this invention is to provide means for changing the quadrantal error of an automatic direction finding loop antenna.

Other objects and advantages of the present invention will become apparent from the following description taken in conjunction with the drawings in which.

Figure 1:
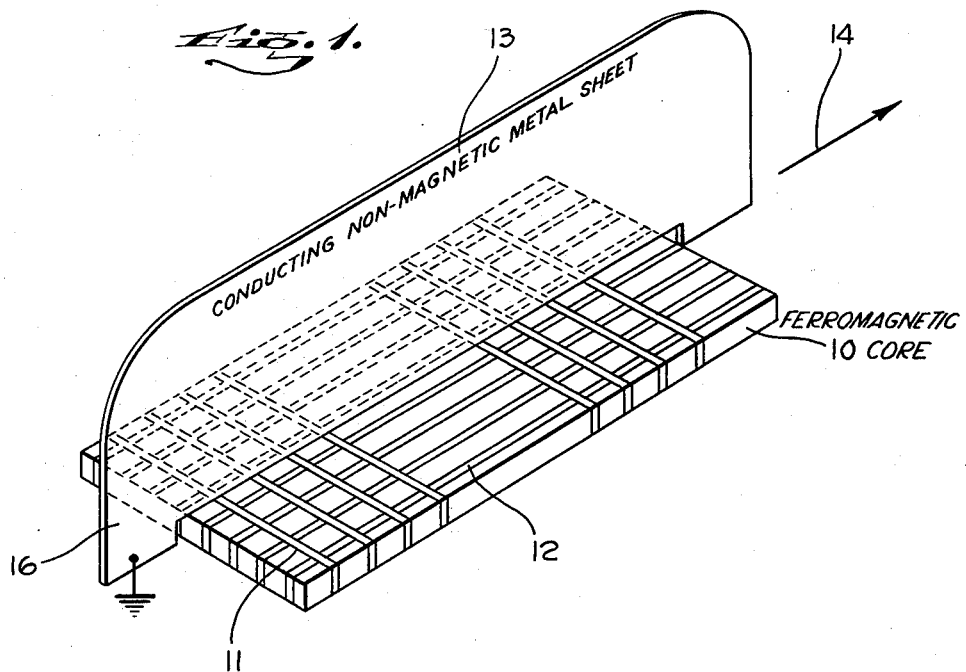
FIGURE 1 is a perspective view of the present invention.

Referring now to FIGURE 1, there is shown a rectangular ferrite core 10 having windings 11 and 12 thereon. Note that the windings 11 and 12 are insulated from each other as well as insulated from the core 10. The insulating may be accomplished in any conventional manner such as described in the above-mentioned prior application. A baffle 13 constructed of a thin nonmagnetic sheet of metal is mounted to split the ferrite core in line with the line of flight as indicated by arrow 14. The baffle 13 need only be thick enough to support itself on the outside of an aircraft fuselage, e.g., 1/64 to 1/32 of an inch thick. Note that the baffle 13 is insulated from the core 10 and windings 11 and 12. In this case, by an air space 15 which is enlarged in the drawing to illustrate the principle, but in actual application any insulative material may be placed in this air space to further support the baffle. The air space is only as large as required to insulate the baffle from the windings. It is also to be noted that although the baffle 13 is electrically grounded at one end 16 to the aircraft such as shown in FIGURE 1, the baffle cannot be grounded at both ends Grounding the baffle at both ends sets up a shorted turn and reduces the sensitivity of winding 12 rather than increasing the sensitivity of winding 12. The grounding of the baffle at one end is not necessary to achieve the desired effect of the loop sensitivity but the grounding of one end of the baffle is desirable for bleed off at static electricity from the baffle.

Figure 2:
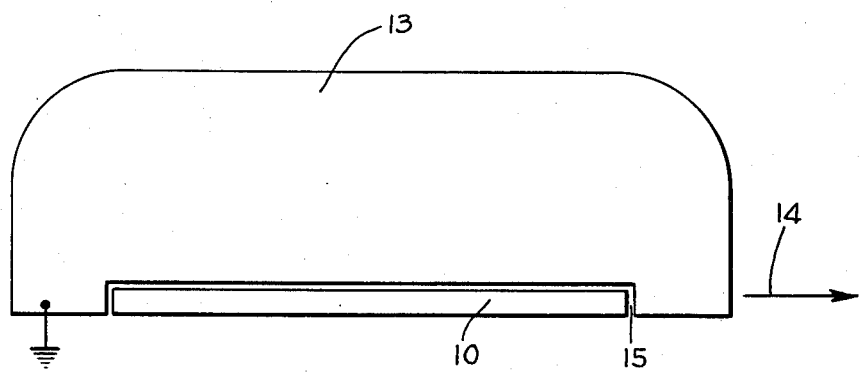
FIGURE 2 is a side view of the present invention.
Figure 3:
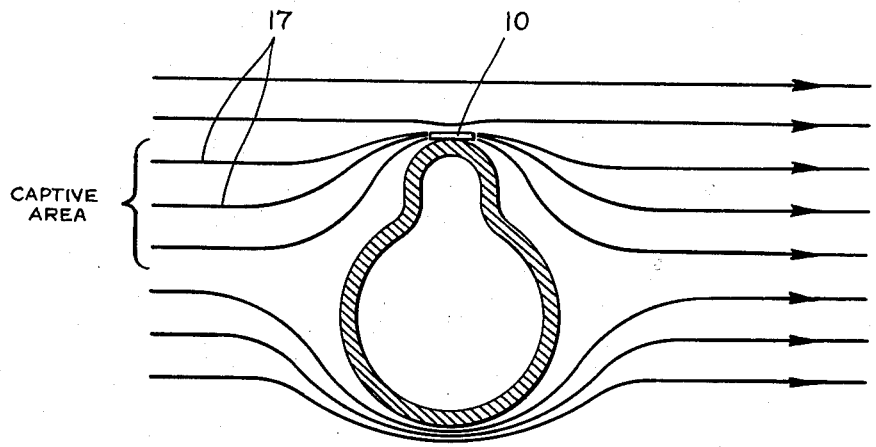
FIGURE 3 is a cross section of an aircraft frame showing the magnetic lines of force.
Figure 4:
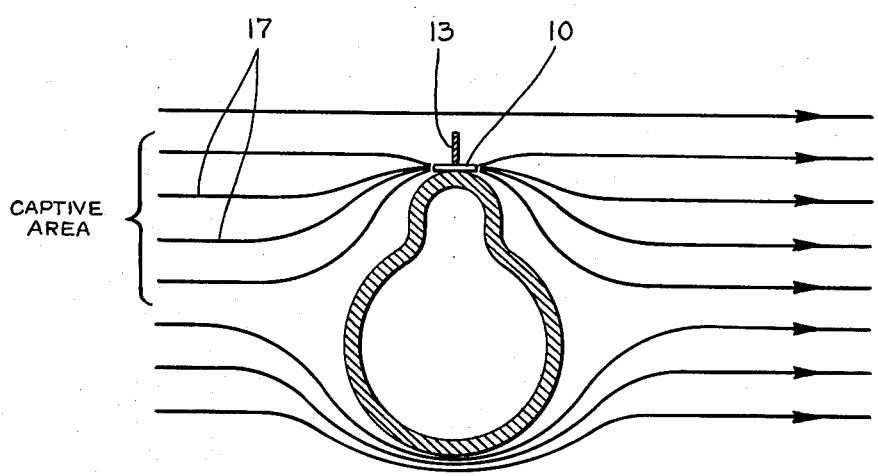
FIGURE 4 is a sectional view of the loop antenna mounted on the aircraft with a baffle in accordance with the present invention.

FIGURE 2 is a side view of FIGURE 1 and further shows the insulative space between the core 10, windings 11 and 12, and the baffle 13. It is to be noted that as stated above, the winding 11 in the configuration shown in FIGURE 1, but without the baffle 13, is more sensitive to radio wave signals from a source parallel to the line of flight, as indicated by arrow 14, than is the winding 12 sensitive to radio wave signals of the same magnitude from a direction perpendicular to the line of flight. The baffle 13 does, however, provide for increasing the sensitivity of the winding 12 by directing more radio waves through the ferrite core 10. FIGURE 3 shows a ferrite core 10, such as the one shown in FIGURE 1, mounted on top of a cross section of the aircraft and the illustrated captive area of the radio wave signals or lines of force 17. FIGURE 4 shows the same antenna mounted on top of an aircraft with a baffle and the illustrated captive area of the line of force 17 are again shown. Note that the captive area has been increased in FIGURE 4 because of the baffle 13.

It can be seen now that the loop antenna is designed so that the windings which are perpendicular to the aircraft body have a greater pickup than the windings which are parallel to the aircraft body. The antenna is mounted any place on the aircraft with the baffle as shown in FIGURES 1 and 2 and 4. The baffling effect of the aircraft body along with the added baffle 13 directs more radio waves through the core in a direction to be picked up by the winding 12, parallel to the body of the aircraft, and thereby reduces the quadrantal error. Once the antenna and baffle are installed on the aircraft it is a simple matter to trim the baffle 13 to change the quadrantal error. In other words, this invention provides an antenna which is mounted on any aircraft and then by changing the size (height or length) of the baffle, which can be done merely by using tin snips, the quadrantal error is changed until it becomes substantially zero. At least the height of the baffle 13 in its initial state is larger than what actually will be used on the aircraft so that by trimming the height of the baffle the quadrantal error is brought to zero. The baffle 13 as shown in FIGURES 1, 2 and 4 extends over the ferrite core for a short distance on both ends of the ferrite core and the baffle is shown somewhat rounded. It has been determined that the baffle effect, from extending the baffle beyond the extremities of the antenna, decreases rapidly with the distance from the core 10 and consequently it is impractical to extend the length of the baffle more than a few inches beyond the ends of the core 10. For the same reason, the corners of the baffle may be rounded to reduce aerodynamic drag and have little effect on the pickup of the winding 12. Note that it is not necessary that the baffle extend beyond the ends of the core 10. A baffle which is shorter than the core of course aids the electrical pickup of the parallel winding less than a baffle of the same height but which is longer or equal in length to the length of the core.

Figure 5:
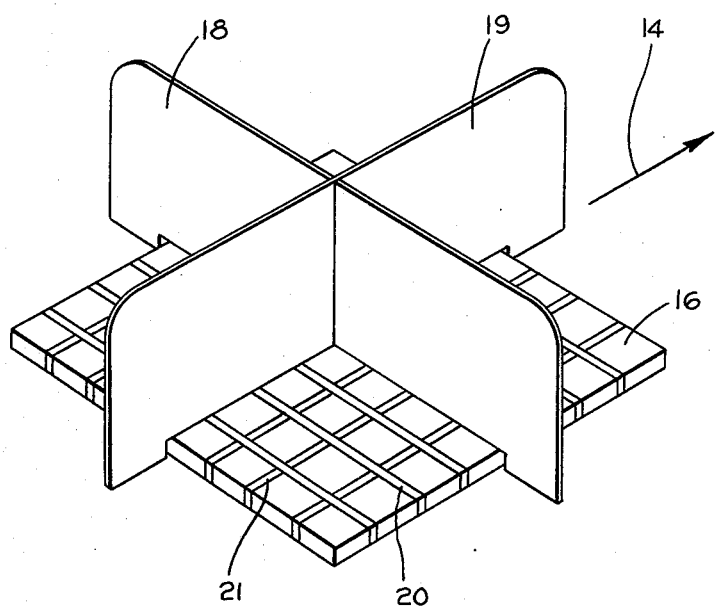
FIGURE 5 is an automatic direction finding loop antenna showing two baffles mounted thereon in accordance with the present invention.

In FIGURE 5, there is shown a loop antenna having cross baffles 18 and 19 thereon. The cross baffles 18 and 19 thereby affect the sensitivity of both the windings 20 and 21, respectively. The device as shown in FIGURE 5 is normally mounted inside the aircraft, that is, out of the airstream. It is obvious that if the antenna shown in FIGURE 5 were mounted on the outside of the aircraft and exposed to the airstream, the baffle 18 would cause undesirable drag.

Figure 6:
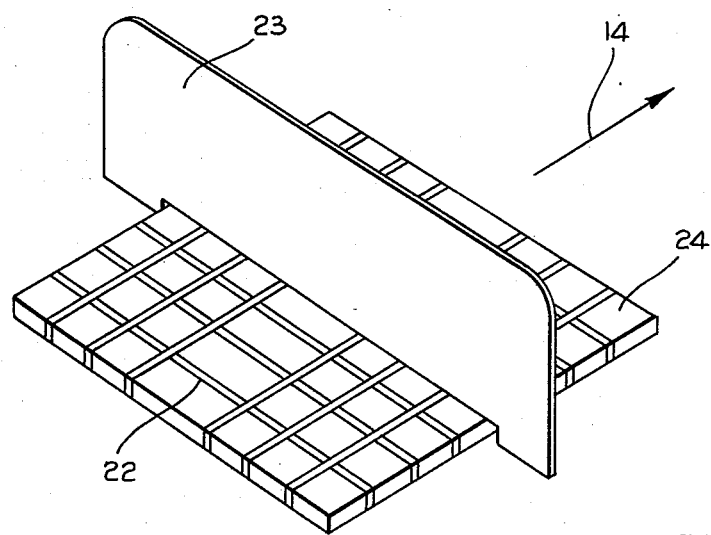
FIGURE 6 is an alternate method of mounting the baffle on the loop antenna in accordance with the present invention.

FIGURE 6 shows a loop antenna 22 with a baffle 23 mounted perpendicular to the line of flight as indicated by arrow 14. In the case of FIGURE 6, the winding 24 running perpendicular to the line of flight as indicated by arrow 14 has the advantage of the added sensitivity due to the baffle. The device as shown in FIGURE 6 is also normally mounted in the aircraft or at least out of the airstream to avoid any undesirable drag on the aircraft.

The baffles as shown are thin sheets of metal. A thicker sheet of metal may be used, but it must be realized that a thick sheet of metal acts as a baffle in both directions to aid the electrical pickup of both windings and also adds drag to the aircraft if the baffle is placed on the outside of the aircraft.

It can be seen now that this invention provides for a means of manufacturing a loop antenna for an automatic direction finder wherein the antenna may be mounted any place on the aircraft and then merely by trimming the baffle 13, the quadrantal error can be changed or altered to suit the particular application.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A direction finding antenna for use on an aircraft including in combination, a flat ferromagnetic core adapted to be positioned with one flat side thereof adjacent a substantially horizontal surface of the aircraft, a first winding about said core having turns substantially perpendicular to the direction of movement of the aircraft, a second winding about said core having the turns thereof substantially parallel to the direction of movement of the aircraft, and a sheet of non-magnetic conducting material extending perpendicular to said core on the side thereof opposite to the side adjacent the aircraft, said sheet extending substantially parallel to the direction of movement of the aircraft and being insulated from said core, said sheet forming a baffle to direct magnetic waves through said second winding to increase the sensitivity thereof.

2. A direction finding antenna for use on an aircraft including in combination, a flat rectangular ferrite core adapted to be positioned with one flat side thereof adjacent a surface of the aircraft, said core being held in a substantially horizontal plane and having one pair of parallel sides substantially parallel to the direction of movement of the aircraft, a first winding about said core having turns substantially perpendicular to the direction of movement of the aircraft, a second winding about said core having the turns thereof substantially parallel to the direction of movement of the aircraft, and a sheet of conducting material extending perpendicular to said core on the side thereof opposite to the side adjacent the aircraft, said sheet extending substantially parallel to the direction of movement of the aircraft and being insulated from said core, said sheet forming a baffle to direct magnetic waves through said second winding to increase the sensitivity thereof.

3. A direction finding antenna for use on an aircraft including in combination, a flat ferromagnetic core adapted to be positioned with one flat side thereof adjacent a substantially horizontal surface of the aircraft, a first winding about said core having turns substantially perpendicular to the direction of movement of the aircraft, a second winding about said core having the turns thereof substantially parallel to the direction of movement of the aircraft, and first and second sheets of non-magnetic conducting material extending perpendicular to each other and to said core on the side thereof opposite to the side adjacent the aircraft, said first and second sheets extending substantially parallel to said first and second windings respectively and being insulated from said core, said sheets forming baffles to direct magnetic waves through said first and second windings to increase the sensitivity thereof.

4. In a direction finding loop antenna system including first and second loop windings positioned perpendicular to each other and provided on a flat ferromagnetic core, the method of increasing the sensitivity of the first loop winding to balance the same with the second loop winding including the steps of, positioning a conducting sheet perpendicular to the core and substantially parallel to the turns of the first loop winding to form a baffle for directing magnetic waves to said first loop winding, and cutting the conductive sheet to thereby adjust the size and the baffling effect of the sheet so that the magnetic waves directed to the first winding increase the sensitivity thereof and the sensitivity of the first winding is substantially the same as that of the second winding.

References Cited in the file of this patent

UNITED STATES PATENTS

| | | |
|---|---|---|
| 1,940,902 | Busignies | Dec. 26, 1933 |
| 2,375,418 | Johnston | May 8, 1945 |
| 2,442,310 | Polydoroff | May 25, 1948 |

FOREIGN PATENTS

| | | |
|---|---|---|
| 751,138 | Great Britain | June 27, 1956 |